United States Patent
Shimoi et al.

[11] Patent Number: 5,193,033
[45] Date of Patent: Mar. 9, 1993

[54] MAGNETIC RECORDING AND REPRODUCING APPARATUS INCORPORATING CLOGGING DETECTION

[75] Inventors: Hiroshi Shimoi, Kyoto; Takafumi Inadomi, Hyogo; Ryoichi Nakamura, Hyogo; Kan Kawahara, Kyoto, all of Japan

[73] Assignee: Mitsubishi Denki Kabushiki Kaisha, Japan

[21] Appl. No.: 794,784

[22] Filed: Nov. 18, 1991

Related U.S. Application Data

[63] Continuation of Ser. No. 351,949, May 15, 1989, abandoned.

[30] Foreign Application Priority Data

May 17, 1988 [JP] Japan .................. 63-120922
Oct. 11, 1988 [JP] Japan .................. 63-255251

[51] Int. Cl.[5] .................. G11B 27/36; G11B 5/41
[52] U.S. Cl. .................. 360/31; 360/128
[58] Field of Search .................. 360/128, 31, 53; 369/71, 72; 15/246

[56] References Cited

U.S. PATENT DOCUMENTS

| 3,731,289 | 5/1973 | Bajgert et al. | 360/128 |
| 4,607,297 | 8/1986 | Sonoda et al. | 360/31 |
| 4,623,940 | 11/1986 | Matsumoto et al. | 360/36.2 |
| 4,631,614 | 12/1986 | Davis et al. | 360/128 |
| 4,704,647 | 11/1987 | Hino | 360/128 |
| 4,827,361 | 5/1989 | Yoshioka | 360/64 |

FOREIGN PATENT DOCUMENTS

| 260950 | 3/1988 | European Pat. Off. |
| 215016 | 12/1984 | Japan . |
| 32102 | 2/1985 | Japan . |
| 198413 | 9/1986 | Japan . |
| 264537 | 11/1986 | Japan . |
| 159321 | 7/1987 | Japan . |

*Primary Examiner*—Andrew L. Sniezek
*Assistant Examiner*—Won Tae C. Kim
*Attorney, Agent, or Firm*—Wolf, Greenfield & Sacks

[57] ABSTRACT

A magnetic recording/reproducing apparatus incorporating a clogging detector includes comparator for comparing with a predetermined value an absolute value of signals which are produced by reproducing recorded signals immediately after recording. Clogging signals may be supplied to cleaner for cleaning heads when the absolute value is less than the predetermined value.

8 Claims, 6 Drawing Sheets

(a) INTERMITTENT DRIVING COMMAND SIGNAL
(b) RPM OF CAPSTAN MOTOR
(c) RECORDING SIGNAL
(d) RECORDING COMMAND SIGNAL
(e) REPRODUCING COMMAND SIGNAL
(f) REPRODUCTION SIGNAL
(g) COMPARISON SIGNAL
(h) CLOGGING SIGNAL

MAGNETIC RECORDING AND REPRODUCING APPARATUS INCORPORATING CLOGGING DETECTION

This application is a continuation, of application Ser. No. 07/351,949, filed May 15, 1989 now abandoned.

BACKGROUND OF THE INVENTION

1. Field of the Invention

The present invention relates to a magnetic recording and reproducing apparatus such as VTR adapted to detect the occurrence of clogging of a head.

2. Description of the Prior Art

When video heads get clogged, efforts to perform recording on a magnetic tape may result in imperfect recording quality or become impossible. If such an imperfect magnetic tape on which recording has been performed is used for reproduction, even with a normal VTR having video heads that are not suffering from clogging, the reproduced image may frequently include noises and it is even possible that no images at all will be reproduced.

Conversely, even if a magnetic tape which has been properly recorded is reproduced by means of a video head which is clogged, many noises may similarly be generated and on occasion no image will be reproduced.

The majority of the causes of clogging are attributed to the fact that the magnetic powder generated by a magnetic tape may stick to the gaps defined by the video heads, inhibiting formation of a normal magnetic circuit. This is inevitable with a VTR or the like.

Such clogging may be easily removed by cleaning the tip of a video head with a cleaning liquid or having a cleaning tape run along said tip.

It is to be understood, however, that the clogging may be easily observed on the monitor screen during reproduction, but clogging is difficult to detect during recording. When it is desired to detect the presence of clogging during recording, recording has to be suspended and the reproduction mode tested in order to detect any clogging.

In particular, video tape recorders used for surveillance for long periods of time (hereafter referred to as "time-lapse VTR") according to the prior art are assumed to continue recording in an unmanned mode all day long, or for months on end in some cases. Thus it is quite unlikely to be possible to reproduce a magnetic record to confirm whether proper recording has definitely been effected. Consequently, it often happens that the subject matter to be recorded is not properly recorded, which is a critical problem with this kind of VTR when so-called "clogging" occurs as a result of adherence to video heads of magnetic powders or the like from the surface of video tapes. This makes it impossible to properly record and reproduce records. As countermeasures directed at solving this problem, not only has it been the practice for users to frequently check the condition of reproduced images and/or to have a specialist periodically check for the presence of "clogging", but there has also been a practice of attaching a head cleaning mechanism as shown in FIG. 1 in order to clean the video heads regardless of whether "clogging" actually occurs or not.

This cleaning mechanism according to the prior art will now be explained by referring to FIG. 1. The numeral 1 in FIG. 1 designates a rotary drum, numeral 10 a tape guide, numeral 2 a rotary roller for cleaning, numeral 11 a support arm for the rotary roller, numeral 12 a spring for pressing, numeral 13 a cam for moving the support arm and numeral 14 a pin for moving the support arm 11.

Operation of the above cleaning mechanism will next be explained by referring to FIGS. 2 through 4. When the tape guide 10 commences movement in the direction indicated by an arrow $d_1$ in FIG. 2 for the purpose of recording or reproduction, the cam 13 is caused to rotate synchronously in the direction indicated by an arrow $d_2$ and the rotary drum 1 is also caused to start rotating. As shown in FIG. 3, the roller 2 is urged against the rotary drum 1 by the biasing spring 12 while the tape guide 10 is moving so that the video head may be cleaned by the roller. At the position where the tape guide 10 completes this movement, the pin 14 will move the support arm 11 against the force of the biasing spring 12, as shown in FIG. 4, whereby the roller 2 is moved away from the rotary drum 1.

In the magnetic recording and reproduction apparatus of prior art, since the video head cleaning mechanism is so constructed that the roller is urged against the head at the time of loading or unloading a tape in the manner described above, and that the head will be cleaned at the time of and with the same frequency as loading regardless of whether the heads are clogged or not, there have been certain problems in that recording cannot always be performed as soon as is necessary, and in that cleaning is performed so often that the heads may be damaged.

SUMMARY OF THE INVENTION

The present invention has been proposed with a view to eliminating such problems as those pointed out above and a first object of the present invention is to provide a magnetic recording and reproducing apparatus having a head cleaning mechanism that allows the heads to be cleaned only when they become clogged so that the heads will not become damaged due to excessive cleaning.

It is a second object of the present invention to provide an apparatus for detecting clogging of video heads in an intermittent magnetic recording apparatus, which is capable of automatically and properly detecting any clogging of the heads during recording without affecting the recording operation at all.

The first object is achieved by a magnetic recording and reproducing apparatus wherein reproduction signals are constantly detected even during recording, the absolute value of the detected signals are watched, and when the absolute value becomes lower due to "clogging", the head cleaning mechanism is caused to operate so as to effect cleaning of the heads.

The second object is achieved by an apparatus for detecting clogging of video heads wherein a recording-/reproducing command circuit is adapted to put the video head in the recording mode while intermittent recording is being conducted by means of the intermittent magnetic recording apparatus and to switch the video head into the reproducing mode during periods when intermittent recording is not being performed upon generation of head operation switching signals, a reproduction envelope comparison circuit is adapted to compare an envelope of reproduction signals during the reproducing mode with a predetermined envelope clogging value, and a clogging output circuit is adapted to detect any clogging of the video head in response to the output from the comparison circuit and to generate clogging signals.

DESCRIPTION OF THE PREFERRED EMBODIMENTS

Figure 1:
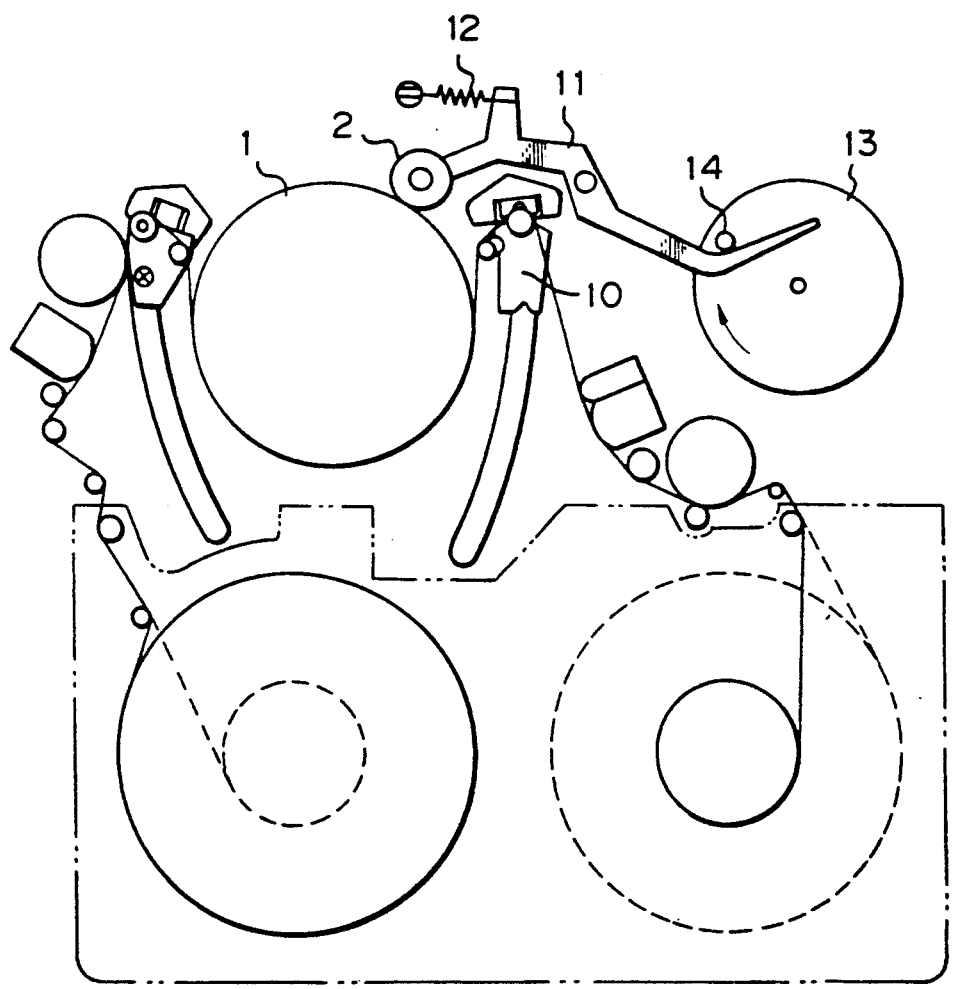
FIG. 1 illustrates a tape movement route of a magnetic recording and reproducing apparatus according to a prior art.
Figure 2:
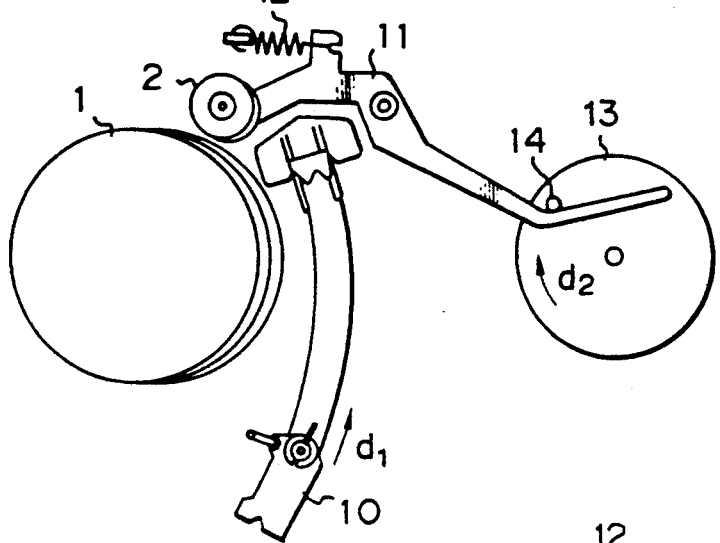
FIGS. 2 through 4 are explanatory views showing operation of the apparatus shown in FIG. 1.
Figure 3:
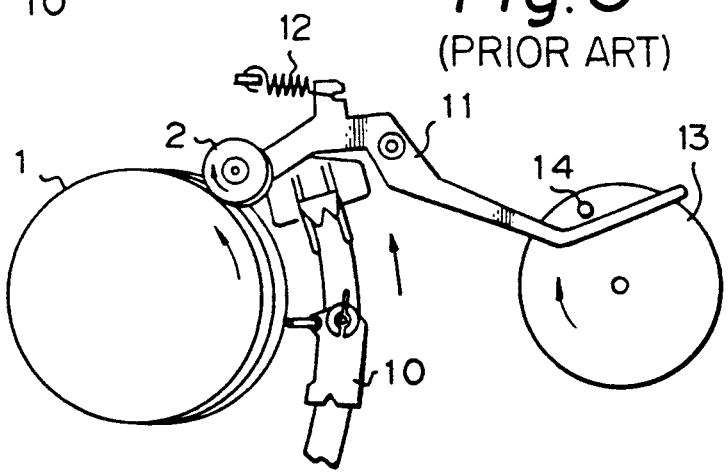
Figure 4:
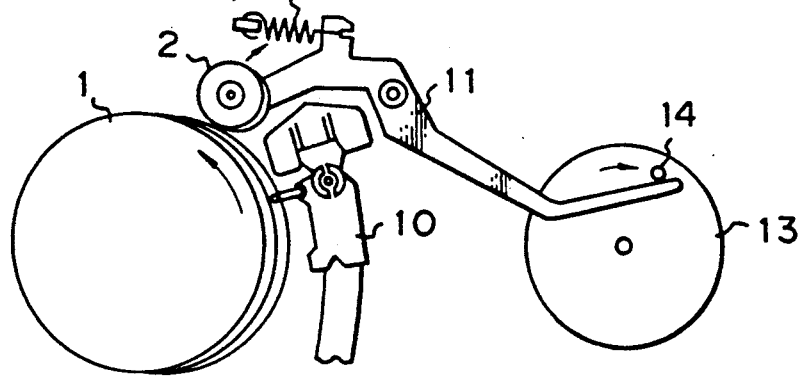
Figure 5:
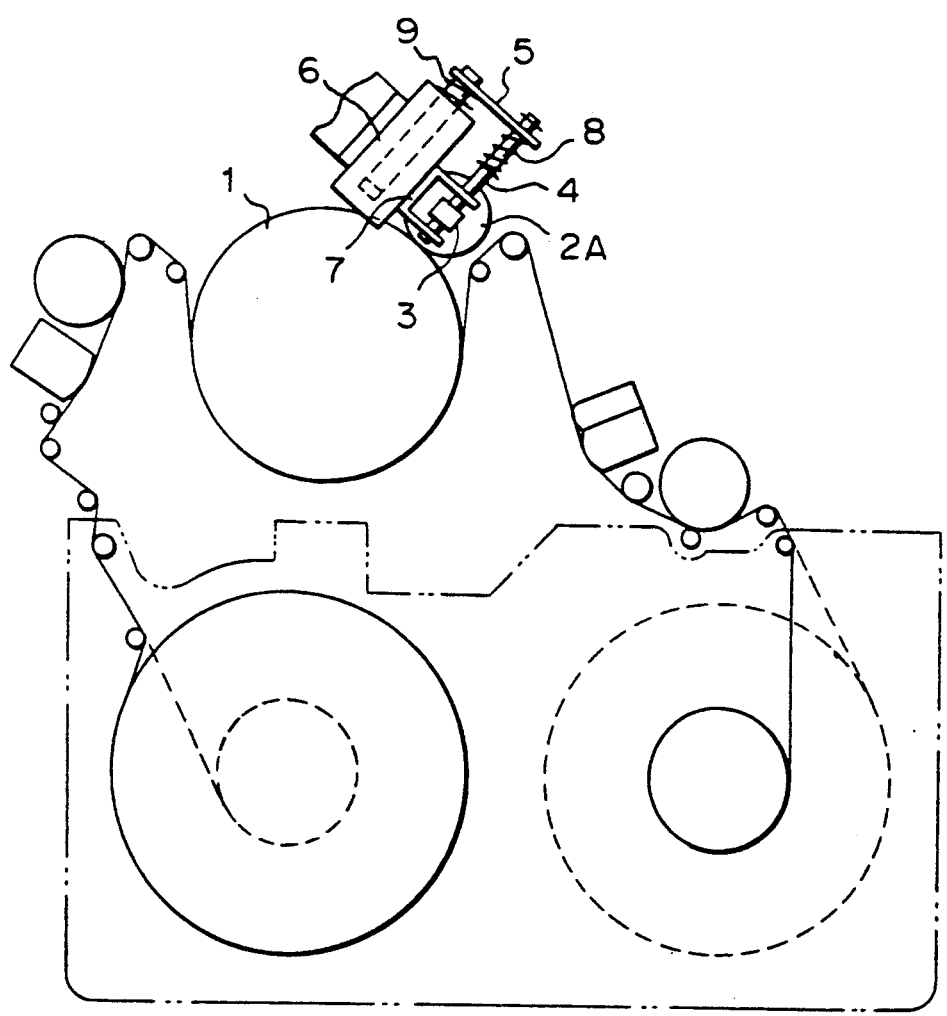
FIG. 5 illustrates a tape movement route of a magnetic recording and reproducing apparatus according to an embodiment of the present invention.
Figure 6:
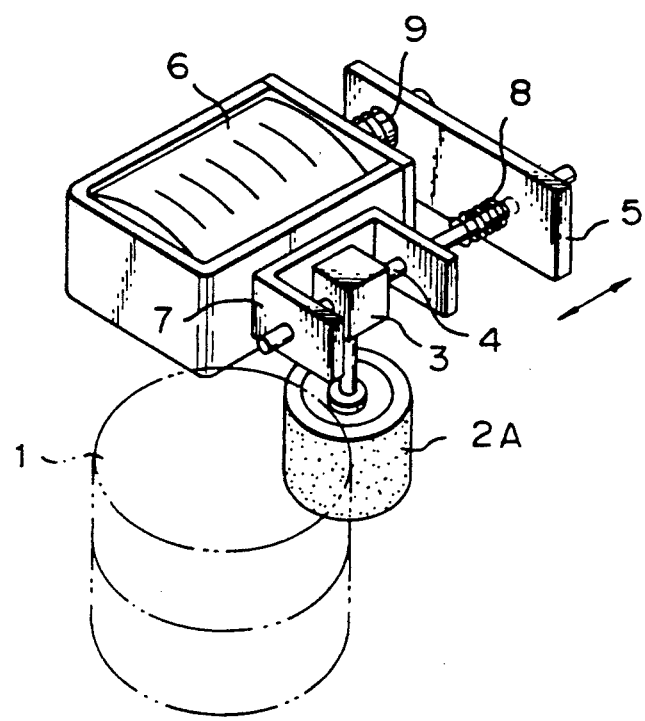
FIG. 6 is a perspective view of the essential part of the route shown in FIG. 5.
Figure 7:
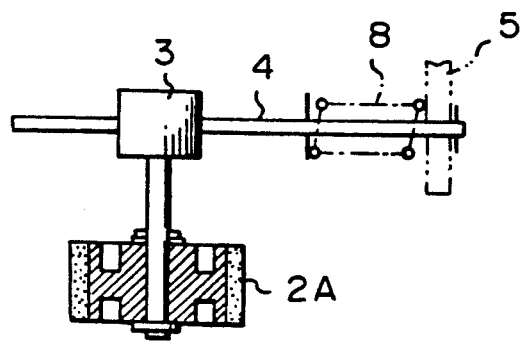
FIG. 7 is a partial sectional view showing assembly of the rotary roller 2A, roller supporting part 3 and shaft 4 shown in FIG. 6.

An embodiment of the present invention will now be explained by referring to FIGS. 5 through 7, which show the constitution of an assembly for cleaning clogging provided in a tape movement route.

In the drawings, numeral 1 designates a rotary drum, numeral 2A shows a rotary roller having fibrous cloth for cleaning wrapped around the outer circumference, and numeral 3 designates a roller support section which is movable in a bearing part 7 by means of a shaft 4 press-fitted into the support section. Numeral 6 designates a solenoid which is energized or de-energized to move the roller supporting section 3 forwardly or backwardly through a transmitting plate 5, a biasing spring 8 and a release spring 9.

Operation of the embodiment shown in FIG. 5 will next be explained.

A time-lapse VTR or the like is normally provided with two sets of heads for normal recording and reproducing and one or two sets of heads for special reproduction. According to the embodiment, two recording heads are used for recording and simultaneously reproducing signals at the portion of the magnetic tape just recorded by use of a head which is not used for recording, so that the absolute value of the signals is continuously read out. Since recording continues over long periods, magnetic powder or the like removed from the tape by the head due to abrasion may stick to the head and cause "clogging", whereupon the absolute value of the output of the reproduction signals will decrease. When the absolute value is detected to be below a predetermined value by a comparison circuit (not shown in FIGS. 5 through 7), the solenoid 6 will be energized for a fixed period of time, for example 2-5 seconds. This energization of the solenoid 6 will cause the rotary roller 2A to be urged against the rotary head part of the rotary drum 1 through the plate 5 and springs 8 and 9 for the same period of time as that during which the solenoid is energized and the head is thus cleaned by the operation of the roller 2A. By detecting the reproduction signals again, if the value of the reproduction signals is lower than a predetermined value, the above-described cleaning operation will be repeated until the value of the signals will become more than the predetermined value, thus "clogging" condition may be eliminated.

It is to be understood that the above-described embodiment relates to a time-lapse VTR, but similar effect may be obtained in application to a business type VTR.

It is also to be understood that according to the above-described embodiment, although a solenoid 6 has been applied to the driving part of the head cleaning mechanism, similar effect may be obtained if such a mechanism as to receive electrical signals and operate in response thereto will be used in place of the solenoid.

A second embodiment of the present invention which is adapted for use as an intermittent magnetic recording apparatus will now be explained by referring to FIGS. 8 through 10.

Figure 8:
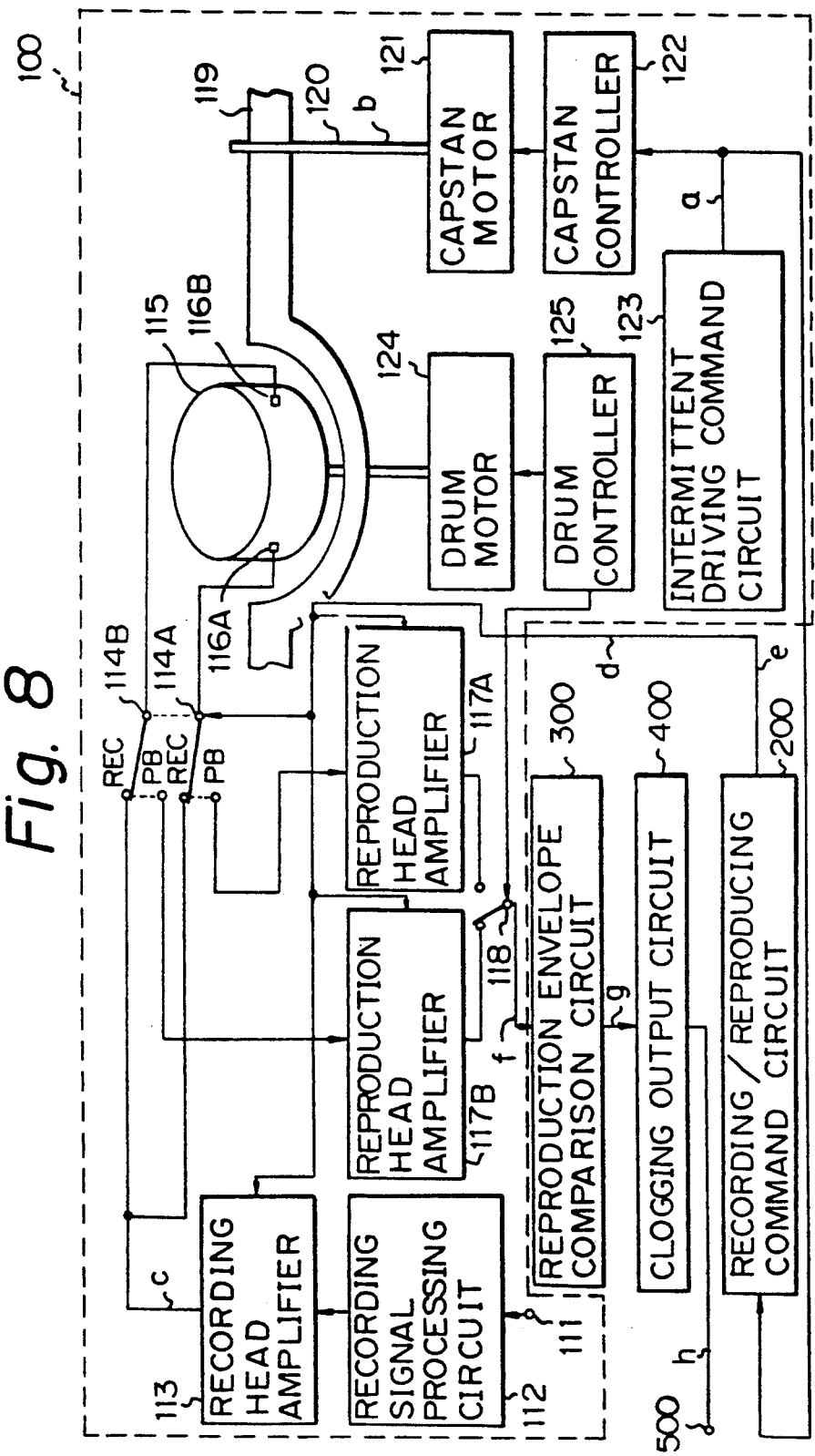
FIG. 8 is a block diagram showing the constitution of an apparatus for detecting clogging of video heads according to a second embodiment of the present invention.

FIG. 8 is a block diagram showing the constitution of an apparatus for detecting clogging of video heads according to an embodiment of the present invention. In FIG. 8, numeral 100 designates the intermittent magnetic recording apparatus, numeral 200 designates a recording and reproduction command circuit, numeral 300 designates a reproduction envelope comparison circuit, numeral 400 designates a clogging output circuit and numeral 500 designates an output terminal for clogging signals.

The intermittent magnetic recording apparatus 100 is constituted in the following manner. Specifically, referring to FIG. 8, numeral 115 designates a rotary drum having video heads 116A and 116B mounted on the circumference thereof. Numeral 124 designates a drum motor which is controlled by a drum controller 125 to synchronize with the vertical synchronizing signals spaced from the image signals in respect of the frequency and phase. Numeral 120 designates a capstan shaft which is driven by a capstan motor 121 to run a magnetic tape 119. Numeral 122 is a capstan controller which is adapted to intermittently drive the capstan motor 121 in accordance with the intermittent driving command signals output from a intermittent driving command circuit 123 and controls movement of the magnetic tape 119 at a predetermined travelling pitch.

Numeral 111 designates an input terminal for the image signals, numeral 112 designates a processing circuit for the recording signals, numeral 113 designates a recording head amplifier, numerals 117A and 117B designate a reproduction head amplifier, numeral 114A and 114B designate head change-over switches adapted to change over the heads between the recording side (hereinafter referred to as REC) and the reproducing side (hereinafter referred to as PB), wherein the image signals input from the input terminal 111 are converted in the recording signal processing circuit (112) to FM signals which are necessary for magnetic recording and are then supplied to the video heads 116A, 116B through the recording head amplifier (113) and the video head change-over switches 114A, 114B.

Numeral 118 designates a reproducing change-over switch which is adapted to receive commands from the drum controller 125 and to be synchronized so that the video heads 116A, 116B track the magnetic tape 119.

The operation of the apparatus with the constitution described above will next be explained.

The capstan motor 121 is designed to be intermittently driven in accordance with a speed pattern of a trapezoidal wave such as that shown in FIG. 9(b), i.e., acceleration-constant speed-deceleration, and the speed pattern differs depending on different control modes of the intermittent drive.

The timing chart in FIG. 9(c) shows the supply of signal current for recording signals to the video heads 116A, 116B. It is to be understood that there are two types of timing; the timing immediately before and after the rotation speed of the capstan motor 121 has reached its maximum, and the timing immediately after the capstan motor 121 has finished its intermittent movement and stopped. In the case of the former, since it is not necessary to provide any significant head step at the video heads 116A, 116B, two-hour mode recording which is a normal type of continuous recording may be conducted with these video heads 116A, 116B, in which case, however, it is necessary for the speed pattern of the capstan motor 121 to be constant.

In the case of the latter type of timing, i.e. still recording, the head step of the video heads 116A, 116B has to conform to the specified width of the recording track, such as 58 μm in the case of two-hour mode recording with the NTSC standard of the VHS system, in order to allow intermittent recording to be performed for one frame. Consequently, since two-hour mode recording which is the normal type of continuous recording has a considerable head step which does not permit intermittent recording to be performed, it is necessary to provide another set of video heads at the rotary drum for exclusive use during two-hour mode recording. However, in this case the speed pattern of the capstan motor 121 may be controlled roughly.

The intermittent recording current supplied to the video heads 116A, 116B is classified as being of two kinds, i.e., the frame recording type in which intermittent supply of the current is for a period equivalent to one frame of the image signal or for one rotation of the rotary drum 115, and the field recording type in which the intermittent current supply is for one field of the image signal or one-half rotation of the rotary drum 115.

The above operation of an intermittent magnetic recording apparatus 100 is similar to prior arts, and the head change-over switch 114A, 114B has been fixed at the REC side in the prior arts.

It is to be noted here that, according to the constitution shown in FIG. 8, in the course of intermittent recording, intermittent drive command signals such as those shown in FIG. 9(a) are supplied to the recording-/reproducing command circuit 200 from the intermittent drive command circuit 123. When the intermittent command signals (a) are supplied in this way to the recording/reproducing command circuit 200, the recording command signals shown in FIG. 9(d) are applied to the recording head amplifier 113 which is thus caused to start operating. These recording command signals (d) are applied at a certain time ($t_1$) before the recording signals shown in FIG. 9(c) so that they avoid the transitionary state of the recording head amplifier during start-up. Concurrently, the head change-over switches 114A, 114B are changed to the REC side by the head change-over signals output from the recording/reproducing command circuit 200.

If the intermittent magnetic recording apparatus 100 is of the frame recording type, a recording current equivalent to one frame of the image signals is simultaneously supplied to the video heads 116A, 116B and an image signal equivalent to one frame is recorded on the magnetic tape 119. On the other hand, if the recording apparatus is of the field recording type, the recording current are supplied simultaneously to the video heads 116A, 116B for a period equivalent to one field during which the magnetic tape 119 is traced by the designated one of the video heads 116A, 116B, and the image signals equivalent to one field will thus be recorded on the magnetic tape 119.

When the intermittent recording explained above is over, the reproduction command signals as shown in FIG. 9(e) are supplied immediately to the reproduction head amplifiers 117A, 118B from the recording/reproducing command circuit 20 and the recording head amplifier 113 is shut off, so that the head change-over switches 114A, 114B are changed over to the PB side.

The above operation during reproduction is regarded as an intermittent recording operation if viewed from the perspective of the entire intermittent magnetic recording apparatus 100. Namely, while intermittent recording is not being executed, only the video heads 116A, 116B, the head change-over switches 114A, 114B and the reproduction head amplifiers 117A, 118B are forced to the side of reproducing during the intervals between respective intermittent recording operations.

The signals from the video heads 116A, 116B are amplified by the reproduction head amplifiers 117A, 118B and are selectively switched by the reproduction change-over switch 118 to provide the reproduction signals shown in FIG. 9(f) which are then fed to the reproduction envelope comparison circuit 300 in the next step. The timing for the switching of the reproduction change-over switch 118 is controlled by the drum controller 125 and synchronized with the timing of the video heads 116A, 116B which are tracing the magnetic tape 119.

The relationship between the wave form of the envelope of the reproduction signals (f) (hereinafter referred to as "reproduction envelope") which are FM signals and the type of recording conducted by the intermittent magnetic recording apparatus 100, which is either of the moving record type or the still record type, and also either of the frame record type or the field record type, will now be explained.

Firstly, in the case of the moving record type of recording, since the reproduction track angle is smaller than the recording track angle, the relevant reproduction envelope will present a triangular wave form which is ramping as shown in FIG. 9(f).

In the case of the still record type of recording, since the recording track angle and the reproduction track angle are the same, the reproduction envelope presents a simple flat wave form.

Further, in the case of both the frame record and moving record types of recording, since the magnetic tape 119 is caused to run forward a little, the reproduction envelope of the recording track which has been recorded earlier at either of the video heads 116A, 116B becomes proportionally smaller than that of the recording track which has been recorded later. The fraction of the earlier reproduction envelope that is proportionally smaller is inversely proportional to the running speed. With regard to the still record type of recording in which the recording tape 119 is stopped during recording, since the respective video heads 116A, 116B will trace the same track during both recording and reproduction, a satisfactory reproduction envelope can be provided.

In the case of the field record type too, since the video head which has been used for recording may also be used for tracing a track at the time of reproduction, a satisfactory reproduction envelope can be attained.

As explained, the reproduction envelopes may differ depending on the type of recording. In any of the types of recording, a sufficient amount of the reproduction envelope to be used for the detection of clogging at the video heads may be applied to the reproduction envelope comparison circuit 300. It is to be noted, however, that, as explained above, in the cases of the frame record and moving record types of recording, as far as the video head which has recorded earlier is concerned, when the speed of the tape is increased above a certain level at the time of recording, the reproduction envelope may drop and thus may not be distinguishable from clogging.

The reproduction envelope which has been applied to the reproduction envelope comparison circuit 300 is compared to a predetermined value of envelope clogging and, depending on the result of such comparison, comparison signals such as those shown in FIG. 9(g) may be provided by the circuit 300.

The reproduction envelope which occurs when the video heads 116A, 116B become clogged will next be explained. Since the amplified gains of the reproduction head amplifiers 117A, 118B are normally designed to be approximately 200 dB, the output of the amplifiers will be approximately 200 mV if the reproduction signals detected by the video heads 116A, 116B are supposed to be 200 µV.

Figure 10:
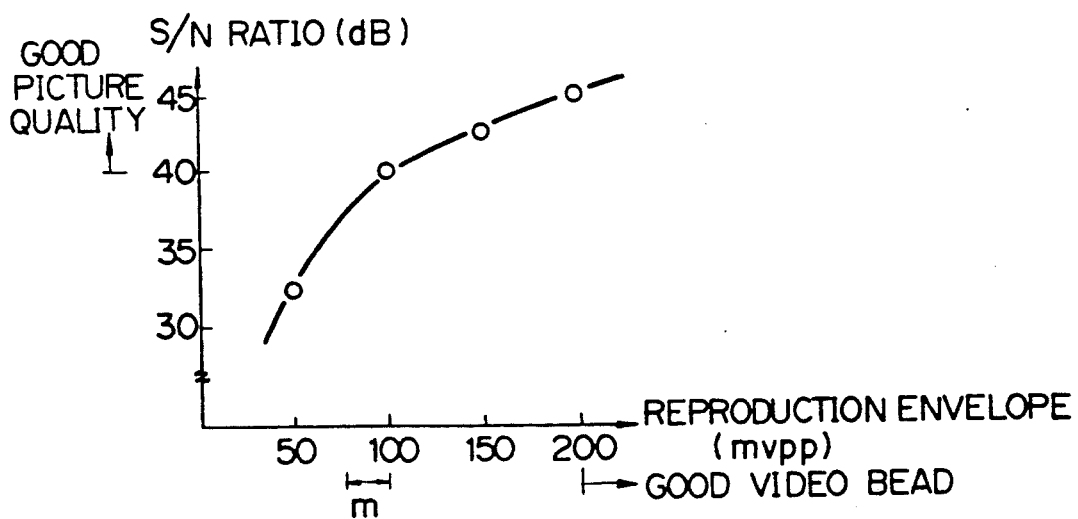
FIG. 10 is a graph showing the relationship between a reproduction envelope and the reproduction S/N ratio.

FIG. 10 is a graph showing the relationship between the S/N ratio of the image signals which are demodulated to the base bands and the reproduction envelope which has decreased due to clogging. As can be seen from this graph, a good video head suffering from no clogging maintains a value of more than 200 mvpp. When clogging occurs and the reproduction envelope falls to about 100 mvpp, a relatively fair picture quality can still be maintained. If the reproduction envelope falls to less than 100 mvpp, however, the picture quality will rapidly deteriorate due to the clogging.

It will be understood from the foregoing explanation that clogging may be suitably detected by setting the value of envelope clogging (m) at a value lower than one half of the reproduction envelope of a clean video head.

As the reproduction signals comprise FM signals of 3-5 MHz band, one example of the constitution of the reproduction envelope comparison circuit 300 is designed to have a band amplifier adapted to amplify signals in the band that are more than 20 dB and an AM detector using diodes as means of detection, whereby the reproduction signals may be amplified and AM-detected thereafter. In this way the reproduction envelope can be provided. The circuit 300 also includes a comparator using an envelope clogging value (m') as a reference for comparison. The comparator may provide comparison signals as shown in FIG. 9(g) as outputs thereof. It is necessary to multiply the envelope clogging value (m) shown in FIG. 10 by the gain value of the band amplifier in order to obtain the reference envelope clogging value (m') of the comparator.

Another example of the constitution of the reproduction envelope comparison circuit 300 is so designed that the reproduction FM signals are directly passed through a comparator when the FM signals input to the circuit 300 have a value above the envelope clogging value (m) which is set as a comparison reference value and these signals output from the comparator are directed through the low pass filter comprising resistor(s) and capacitor(s), whereby comparison signals are provided as shown in FIG. 9(g).

Thus, the comparison signals (g) provided by the reproduction envelope comparison circuit 300 are applied to the clogging output circuit 400 in the next stage. The role of the clogging output circuit 400 is as follows. Specifically, the reproduction envelopes have wave forms of a triangular configuration or somewhat uneven flat wave forms, so that constant comparison outputs cannot necessarily be provided for the entire period of a field. At the final part of one field, if any comparison outputs are obtained in such a field, it is then concluded that there has been no clogging in this field. On the other hand, if no comparison outputs have been provided in the entire period of one field, it is concluded that there has been some clogging in the field. Further, in order to eliminate malfunction of the circuit due to noises and to positively detect the presence of any clogging, a circuit designed to determine clogging only if clogging is detected successively in several fields may be incorporated after or within the circuit 400.

The constitution of the clogging output circuit 400 as explained above may be readily provided in combination with flip-flops.

The clogging signals shown in FIG. 9(h) which are the final outputs may be output from the clogging output circuit 400 and appear at the clogging signal output terminal 500 as explained above.

Figure 9:
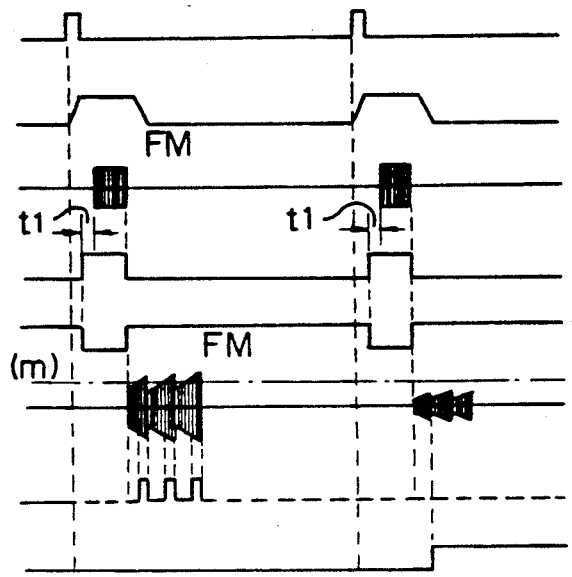
FIG. 9 is a waveform diagram showing operation timing.

As seen from FIG. 9, while the intermittent recording is stopped, the video heads 116A, 116B are changed to the reproduction mode in order to detect whether there is any clogging or not. When the intermittent drive command signal is applied in the next cycle as denoted by FIG. 9(a), the video heads 116A, 116B are changed again to the recording mode so that intermittent recording may be executed. Subsequently, similar cycles are repeated whereby intermittent recording and detection of clogging may be repeated alternately.

It is to be noted that according to the second embodiment described above, the video heads 116A, 116B comprise a so-called two-head system wherein the video head which has been used for intermittent recording will be changed to the reproduction mode in order to determine whether there is any clogging or not. It is also possible to provide a so-called three- or four-head system comprising a composite video head wherein the video head for exclusive of reproduction use is used for clogging detection, so that clogging may be checked during both recording and reproduction.

Incidentally. It is to be noted that any clogging detected may be automatically cleaned by a suitable method like that employed in the first embodiment.

As explained above, according to the present invention, when "clogging" occurs at the heads due to any change in environmental conditions or certain problems with the magnetic tape, the head and/or its driving system, the clogging is automatically and immediately detected. The head may thus be cleaned rapidly as soon the clogging is detected, so that stable image recording may be accomplished even if recording is continued for long periods of time in a time-lapse VTR or the like.

While preferred embodiments have been described, variations thereof will occur to those skilled in the art within the scope of the present invention concepts which are delineated by the following claims.

What is claimed is:

1. A magnetic recording and reproducing apparatus including magnetic tape movement means in which a magnetic tape is wound around a rotary drum, comprising:
   a magnetic head on said drum operating in a recording mode wherein the magnetic head intermittently records signals on the magnetic tape and also operating in a reproducing mode wherein the magnetic head reproduces signals from the magnetic tape;
   a controller for controlling operation of the magnetic head, said controller including:
      means for determining completion of an interval of reading signals;
      means for automatically switching the magnetic head to reproducing mode, after completion of the interval of recording signals, to reproduce signals intermittently recorded during the interval;
   envelope comparison means for producing a comparison signal when an envelope signal based on the reproduced intermittently recorded signals is higher than a predetermined value, said comparison signal comprised of peaks corresponding to portions of the envelope signal that exceed the predetermined value;
   clogging output means for outputting a clogging signal in response to the comparison signal from the envelope comparison means; and
   a cleaning mechanism for cleaning the magnetic head when the clogging signal indicates that the head is clogged, said cleaning mechanism comprising:
      a solenoid that is energized in response to said clogging signal;
      a solenoid shaft that moves when the solenoid is energized;
      a roller that is urged against the head when the solenoid is energized to clean the head;
      a support shaft that is coupled to the roller;
      a transmitting plate coupled to said support shaft and to said solenoid shaft to transfer movement of the solenoid shaft when the energized to the support shaft such that the support shaft and the solenoid shaft concurrently move in parallel to each other; and
      means for limiting movement of the support shaft.

2. A magnetic recording and reproducing apparatus, said apparatus comprising:
   a magnetic head on a drum operating in a recording mode wherein the magnetic head intermittently records signals on a magnetic tape and also operating in a reproducing mode wherein the magnetic head reproduces signals from the magnetic tape;
   a controller for controlling operation of the magnetic head said controller including:
      means for automatically switching the magnetic head to reproducing mode, after completion of an interval of recording signals, to reproduce signals intermittently recorded during the interval;
   envelope comparison means for producing a comparison signal when an envelope signal based on the reproduced intermittently recorded signals is higher than a predetermined value;
   clogging output mean for outputting a clogging signal in response to the comparison signal from the envelope comparison means; and
   a cleaning mechanism for cleaning the magnetic head when the clogging signal indicates that the head is clogged, said cleaning mechanism comprising:
      a solenoid that is energized in response to said clogging signal;
      a solenoid shaft that moves when the solenoid is energized;
      a roller that is urged against the head when the solenoid is energized to clean the head;
      a support shaft that is couple to the roller;
      a transmitting plate coupled to said support shaft and to said solenoid shaft to transfer movement of the solenoid shaft when energized to the support shaft such that the support shaft and the solenoid shaft concurrently move in parallel to each other; and
      means for limiting movement of the support shaft.

3. A a magnetic recording and reproducing apparatus being adapted to intermittently record signals on a magnetic tape including at least one recording and reproducing head mounted on a rotary drum,
   head change switch means for switching the head between a reproducing mode in which the head reproduces signals from a magnetic tape and a recording mode in which the records signals on the magnetic tape;
   recording head amplifier means coupled to the head change switch means for amplifying signals to be recorded on the magnetic tape;
   reproducing head amplifier means for amplifying signals reproduced from the tape;
   recording and reproducing command means for producing a recording command signal, a reproducing command signal and a head change command signal;
   the recording command signal being supplied to the recording head amplifier means at each recording interval in a sequence of intermittent recording in order to energize the recording head amplifier means;
   the reproducing command signal being supplied to the reproducing head amplifier means at each time interval other than a recording interval in order to energize the reproducing head amplifier means;
   the head change command signal being supplied to the head change switch means in order to connect the head to the reproducing head amplifier means at each time interval other than a recording interval;
   envelope comparison means for producing comparison signal when an envelope signal based on a signal from the reproducing head amplifier means higher than a predetermined value said comparison signal comprised of peaks corresponding to portions of the envelope signal that exceed the predetermined value;
   clogging output means for outputting a slogging signal if the comparison signal from the envelope comparison means indicates that the recording and reproducing head is clogged: and
   a cleaning mechanism for cleaning the magnetic head when the clogging signal indicates that the head is clogged, said cleaning mechanism comprising:
      a solenoid that is energized in response to said clogging signal;
      a solenoid shaft that moves when the solenoid is energized;

a roller that is urged against the head when the solenoid is energized to clean the head;

a support that is coupled to the roller;

a transmitting plate coupled to said support shaft and to said solenoid shaft to transfer movement of the solenoid shaft when energized to the support shaft such that the support shaft and the solenoid shaft concurrently move in parallel to each other; and means for limiting movement of the support shaft.

4. An apparatus according to claim 3, wherein said clogging output means output said clogging signal when the clogging output means do not receive the comparison signal for several fields.

5. An apparatus according to claim 3, wherein said envelope comparison means includes an AM detector for producing said envelope signal and a comparator for comparing the envelope signal with said predetermined value.

6. An apparatus according to claim 3, wherein said envelope comparison means includes a comparator for comparing said signal from said reproducing head amplifier means with said predetermined value and a low-pass filter for producing said comparison signal based on comparison performed by the comparator.

7. A magnetic recording and reproducing apparatus including magnetic tape movement means in which a tape is wound around a rotary drum, having a plurality of magnetic heads, with a certain wrapping angle relative to the drum, is moved thereby comprising:

means for providing signals during recording by reproducing a recorded signal, using a magnetic head that is not in use for recording;

means for comprising a magnitude of the signals to a predetermined value to provide a clogging signal for the head when the magnitude of the signals is less than the predetermined value; and means for cleaning the head, adapted for contact with the head of the drum in response to the clogging signal, comprising:

a solenoid which is energized by said clogging signal;

a rotary roller that is urged against said head when the solenoid is energized;

roller support section supporting said rotary roller;

a support shaft press fitted to said roller support section;

a bearing element for limiting movement of the rotary roller towards and away from said rotary drum;

a biasing spring positioned around said shaft for support biasing the rotary roller;

a solenoid shaft simultaneously moving in parallel with said support shaft in a same direction when said solenoid is energized;

a releasing spring positioned around said solenoid shaft; and a transmitting plate coupled to said support shaft and to said solenoid shaft to transmit movement of the solenoid shaft when energized to said support shaft.

8. A magnetic recording and reproducing apparatus, comprising:

a) a magnetic head means, which in a recording mode intermittently records signals on a magnetic tape during intermittent recording periods, wherein only a single field or frame is recorded per each intermittent recording period and which in a reproducing mode reproduces signals that are recorded during recording mode from the magnetic tape without rewinding the tape;

b) a controller for controlling operation of the magnetic head means, said controller comprising:

i) means for determining completion of an intermittent recording period;

ii) means for automatically switching the magnetic head means from recording mode to reproducing mode after completion of an intermittent recording period to reproduce signals recorded during the intermittent recording period;

iii) envelope comparison means for producing a comparison signal when an envelope signal based on reproduced intermittent recorded signals exceeds a predetermined threshold; and iv) clogging output means for outputting a clogging signal in response to the comparison signal from the envelope comparison means; and c) a cleaning mechanism for cleaning the magnetic head when the cleaning signal indicates that the head is clogged, said cleaning mechanism comprising:

a solenoid that is energized in response to said clogging signal;

a solenoid shaft that moves when the solenoid is energized;

a roller that is urged against the head when the solenoid is energized to clean the head;

a support shaft that is coupled to the roller;

a transmitting plate coupled to said support shaft and to said solenoid shaft to transfer movement of the solenoid shaft when energized to the support shaft such that the support shaft and the solenoid shaft concurrently move in parallel to each other; and means for limiting movement of the support shaft.

* * * * *